(12) United States Patent
Jolly

(10) Patent No.: US 7,105,742 B1
(45) Date of Patent: Sep. 12, 2006

(54) ELECTRICAL BOX WITH MOUNTING SCREW GUIDE

(75) Inventor: Robert K. Jolly, Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/147,712

(22) Filed: Jun. 7, 2005

(51) Int. Cl.
*H02G 3/08* (2006.01)

(52) U.S. Cl. .................. 174/50; 174/57; 174/58; 439/142; 248/906

(58) Field of Classification Search .......... 174/50, 174/57, 58; 220/3.6, 3.9, 3.2; 439/142; 248/906
See application file for complete search history.

(56) References Cited

U.S. PATENT DOCUMENTS

| | | | |
|---|---|---|---|
| 2,063,923 A | 12/1936 | Gries | |
| 2,286,898 A | 6/1942 | Cover | |
| 2,315,746 A | 4/1943 | Stewart | |
| 2,340,823 A | 2/1944 | Scott | |
| 3,014,476 A | 12/1961 | Barnet | |
| 4,120,473 A | 10/1978 | Suk | |
| 4,408,696 A * | 10/1983 | Crosson | 220/3.6 |
| 5,004,199 A | 4/1991 | Suk | |
| 5,020,450 A | 6/1991 | Lichter | |
| 5,449,859 A | 9/1995 | Bordwell | |
| 5,571,023 A * | 11/1996 | Anthony | 439/142 |
| 5,600,093 A | 2/1997 | Herth et al. | |
| 5,710,392 A * | 1/1998 | Bordwell et al. | 174/50 |
| 6,669,041 B1 | 12/2003 | Almond | |

\* cited by examiner

*Primary Examiner*—Dhiru R. Patel
(74) *Attorney, Agent, or Firm*—Hoffmann & Baron, LLP

(57) ABSTRACT

An outlet box assembly for termination of electrical and/or communication wires. The outlet box assembly generally includes a housing defining an interior therein and a cover attached to the housing, wherein a mounting screw guide is formed between the cover and the housing upon attachment of the cover to the housing for holding and guiding a mounting screw during mounting of the box assembly to a structure.

15 Claims, 2 Drawing Sheets

ELECTRICAL BOX WITH MOUNTING SCREW GUIDE

FIELD OF THE INVENTION

The present invention relates generally to an electrical outlet box which houses power and/or communication wires for termination. More specifically, the present invention relates to an outlet box assembly having a guide for holding a mounting screw during fastening of the outlet box to a surrounding structure.

BACKGROUND OF THE INVENTION

It is well known to use electrical outlet boxes to terminate electrical wires and cables. Such outlet boxes permit the insertion of electrical wires into the box, which are terminated to electrical fixtures, such as switches and receptacles in an electrical outlet box. It has also become necessary to terminate communications wires for such purposes as data, voice and signal transmission and networking computers. While terminations are not required to be housed in an electrical box, as are electrical terminations, aesthetics and convenient usage has dictated the need to place the communication terminations in close proximity to the electrical terminations.

In office spaces and other commercial environments it is often desired to have access to electrical outlets or other electrical connections at locations located a distance from standard wall outlets. In order to safely accommodate such situations, floor boxes and/or ceiling boxes are typically used. These boxes may be located in the floor or ceiling, near or at the location, such as under a work cubicle or near a piece of machinery, where the connection is needed.

Some floor boxes are designed to be supported within a poured concrete floor. One of the problems in positioning a floor box is that the installer must ensure that the floor box is both flush and level with the top of the poured floor in which it is set. Other floor boxes may include a flange which sits on top of the floor surface and including an opening to permit access to the electrical connections. A cover is typically removably positionable over the opening to prevent inadvertent contact with the connectors and to restrict debris from contaminating the connectors.

In any event, conventional electrical boxes are typically installed in a structure by mounting the box to a support stud of the structure by means of a nail or screw attachment that is incorporated in the box design. Some boxes have protruding accessory exterior sheaths for nailing the box to an exposed wood or metal stud within a building. However, because the screw or nail mounting brackets protrude from the external shape of the work box, the brackets may interfere with the flush mounting of the box within a hole of the building wall, floor or ceiling.

Accordingly, it is desirable to provide such electrical boxes with an internal fastener mounting means for fasteners such as screws or nails, which does not protrude above the exterior shape of the box. In this regard, it is known in the art to provide fastener holes or mounting brackets on the interior surfaces of the box in which a fastener is accessible, for example, by a screwdriver from the inside of the box. However, one drawback with these type boxes is the necessity for the installer to simultaneously hold the fastener and manually position the electrical box during mounting of the box to a structure. This makes installation difficult and prone to incorrect mounting.

Another disadvantage of this configuration relates to the holes or apertures which must be formed in the side wall of the box to accommodate the fasteners. Many electrical boxes today are formed by molding, wherein specially designed slides or cams, as part of the molding tooling, are required to form holes or apertures in a molded surface. Such specialty tooling becomes even more expensive when angled fastener holes or mounting brackets are desired.

It is therefore desirable to provide an electrical box that provides for simple installation and that is economically manufactured using a standard mold die.

SUMMARY OF THE INVENTION

The present invention is an outlet box assembly for termination of electrical and/or communication wires. The outlet box assembly generally includes a housing defining an interior therein and a cover attached to the housing, wherein a mounting screw guide is formed between the cover and the housing upon attachment of the cover to the housing for holding and guiding a mounting screw during mounting of the box assembly to a structure.

In a preferred embodiment, the mounting screen guide is formed between a bottom surface of the cover and a top surface of the housing upon attachment of the cover to said housing. These surfaces may represent respective mold parting lines of the housing and the cover. The top surface of the housing preferably includes a groove formed therein and the bottom surface of the cover includes a finger extending therefrom. The finger cooperates with the groove to form the mounting screw guide. The finger preferably has a width substantially equal to a width of the groove to provide a slip fit relationship therebetween.

Also, the groove preferably includes a bottom defined by a shelf and the finger preferably includes an end face, wherein the mounting screw guide is formed between the shelf and the end face. The groove shelf also preferably extends inwardly into the housing interior to form a ledge for facilitating initial placement of the mounting screw in the mounting screw guide. Furthermore, the shelf and the finger end face are preferably formed at an angle with respect to the upper surface of the housing, wherein the shelf is closest to the upper surface of the housing at the housing interior.

Preferably, the shelf and the finger end face further define an inner guide portion adjacent the housing interior and a threadable outer portion. The guide portion has a dimension substantially equal to the diameter of a mounting screw and the threadable portion is narrower than the guide portion. The threadable portion is adapted to be threaded by the mounting screw upon tightening of the mounting screw.

The housing may be adapted to accommodate electrical and/or communication fixtures mounted directly therein, or it may take the form of an extension whereby the housing is adapted for mounting a separate outlet box thereto. The cover may include a frame and a lid hingedly attached to the frame. In this case, the lid preferably includes a latch adapted to releasably engage the frame.

The preferred embodiments of the outlet box assembly of the present invention, as well as other objects, features and advantages of this invention, will be apparent from the following detailed description, which is to be read in conjunction with the accompanying drawings.

DETAILED DESCRIPTION OF THE PREFERRED EMBODIMENTS

Figure 1:
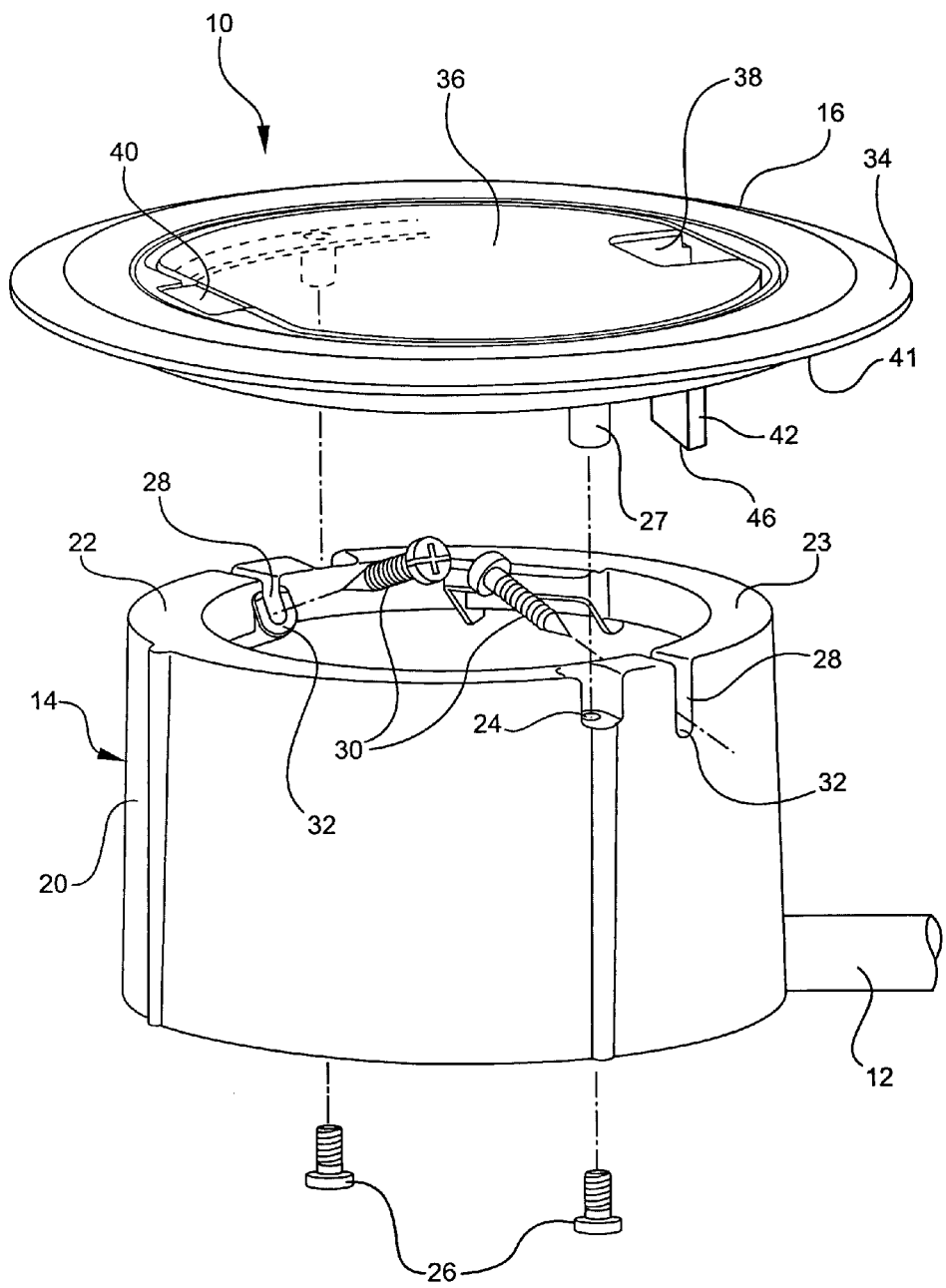
FIG. 1 is an exploded perspective view of an electrical box with mounting screw guide formed in accordance with the present invention.

Referring first to FIG. 1, the electrical outlet box assembly 10, formed in accordance with the present invention, is shown in an exploded condition. The electrical outlet box assembly 10 provides for the accommodation of electrical fixtures (not shown), such as switches or receptacles, and/or communication fixtures (not shown), such as data plugs, coaxial connectors, fiber optic connectors and the like, which provide for termination of voice, data or signal wires. An electrical/communication conduit 12 is connected to the box 10 for feeding electrical and/or communication lines or wires to the fixtures within the box.

The electrical box assembly 10 generally includes a base housing 14 and a cover unit 16, which is attachable to the base housing. The base housing 14 and the cover unit 16 may be formed of a wide variety of materials as is well known in the art. Preferably, the housing 14 and the cover 16 are formed of a suitable integrally molded plastic, such as polycarbonate or polyvinylchloride (PVC). In the particular example shown herein, the housing 14 and the cover 16 are made in a circular or cylindrical configuration. However, the invention is not limited to this shape, but may take any other shape. For example, the housing 14 and cover 16 may take a square, rectangular or octagonal form.

Figure 2:
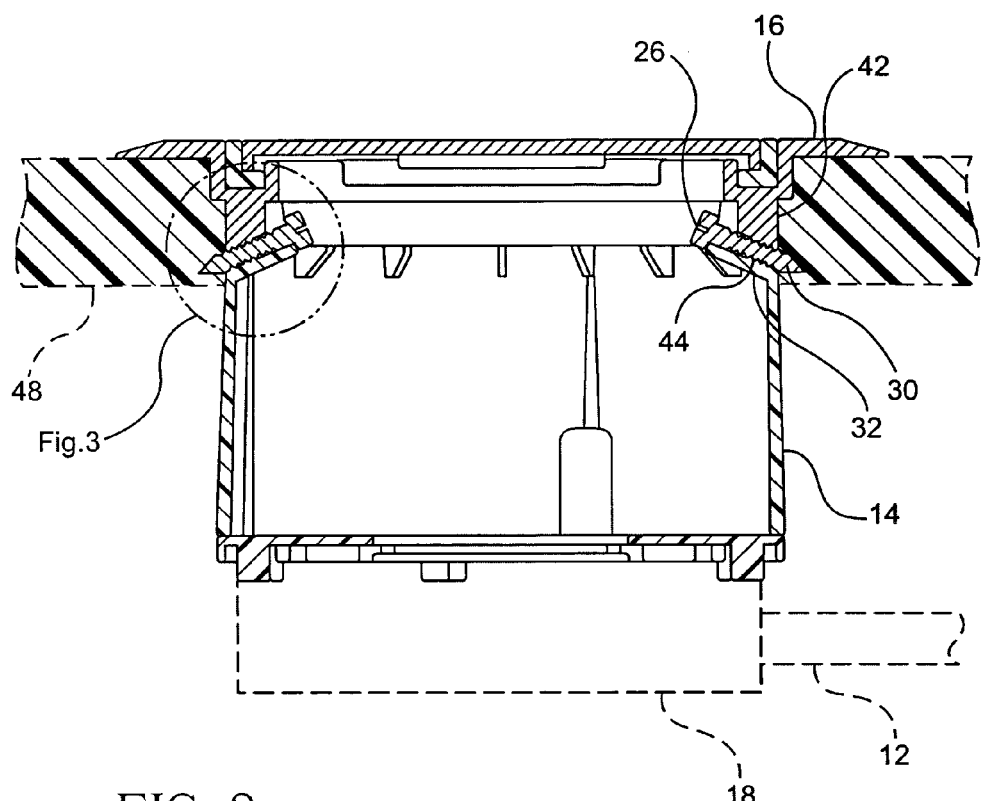
FIG. 2 is a cross-sectional view of the box shown in FIG. 1.

Moreover, the housing 14 may be adapted or designed to accommodate the electrical and/or communication fixtures mounted directly therein. In this case, the housing 14 functions as the outlet box. Alternatively, the housing 14 may be designed as an extension or spacer between the cover 16 and the actual outlet box 18, as shown in FIG. 2. In this case, the electrical and/or communication fixtures are not mounted directly in the housing 14.

In either embodiment, the housing 14 generally includes a side wall 20 terminating at its upper end in a rim 22. The rim 22 defines a top surface 23 of the housing 14 and preferably includes at least one unthreaded aperture 24 to receive a screw 26 for fastening the cover 16 to the housing 14 via a threaded boss 27 formed on the cover. Also formed in the rim 22 is at least one transverse groove 28 extending between the interior of the housing 14 and the exterior. The groove 28 has a width sufficient to receive a mounting screw 30 for mounting the box assembly 10 to a building structure.

The bottom of the groove 28 is defined by a shelf 32, which preferably extends a small distance inwardly into the housing interior to form a ledge 33. The ledge 33 facilitates initial placement of the screw 30 in the mounting guide. The shelf 32 is also preferably formed at an angle with respect to the rim 22. In particular, starting at the interior of the housing, the shelf 32 is closest to the rim 22 and gradually slopes downwardly away from the rim as it terminates at the exterior of the housing. In other words, the depth of the groove 28 is at its most shallow at the interior of the housing 14 and gradually becomes deeper as it approaches the exterior of the housing. As will be discussed in further detail below, the shelf 32 forms part of a screw guide for holding the mounting screw 30 during mounting of the box assembly 10 in a building.

The cover unit 16 generally includes a frame 34 and a lid 36 hingedly attached to the frame to protect the interior of the housing when the cover is attached thereto. The lid 36 may include a releasable latch 38 to secure the lid in a closed position. Upon release of the latch 38, the lid 36 may be pivoted about its hinge 40 to provide access to the interior of the housing 14.

Formed on the bottom surface 41 of the frame 34 (i.e., the side of the frame facing the housing 14 upon assembly) is at least one downwardly extending finger 42. The cover 16 preferably includes the same number of fingers 42 as the housing 14 has grooves 32. The finger 42 has a width, which is slightly less than the width of the groove 32 formed in the housing 14, to provide a slip fit relationship between the two when the cover 16 is affixed to the housing.

Figure 3:
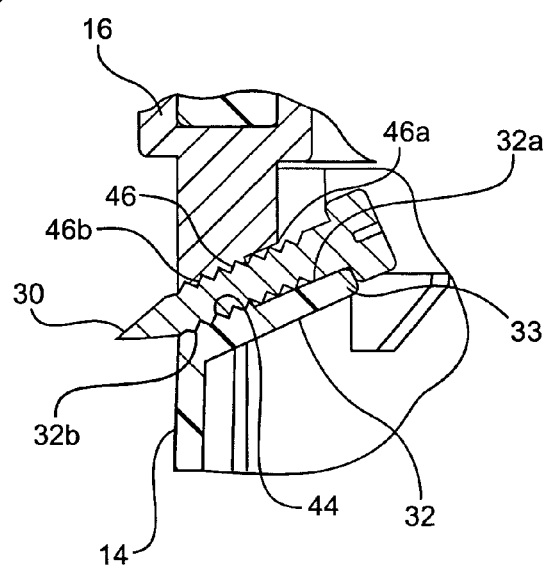
FIG. 3 is a detailed view of the mounting screw guide shown in FIG. 2.

The finger 42 further has a length, which is sufficiently less than the depth of the groove 32 formed in the housing 14, to provide a screw receiving space or guide 44 between the finger and the groove shelf 32 when the cover 16 is affixed to the housing. In this regard, the finger 42 terminates at an end face 46, which is preferably formed at an angle with respect to the frame 34. In particular, starting at the interior of the frame 34, the end face 46 is closest to the frame and gradually slopes downwardly away from the frame as it approaches the edge of the frame. In other words, the length of the finger 42 is at its least at the interior of the frame 34 and gradually becomes longer as it approaches the exterior of the frame. In this manner, the end face 46 of the finger 42 cooperates with the shelf 32 and the sidewalls of the groove 28 to form a screw receiving space 44 formed therebetween, as shown most clearly in FIG. 3.

The screw receiving space 44 thus formed provides a guide for the mounting screw 30 during installation of the box assembly 10 in a building structure 48. Preferably, the screw receiving space 44 is defined by an inner guide portion and an outer threadable portion. In particular, both the end face 46 of the finger 42 and the shelf 32 of the groove 28 are preferably provided with an inner screw guide portion 46a and 32a, which, when the finger is seated in the groove, are spaced apart from each other a distance which is essentially the same as the diameter of the screw 30. These guide portions 46a and 32a thus define an initial insertion guide for the screw 30. The end face 46 of the finger 42 and the shelf 32 of the groove 28 are both further preferably provided with a step leading into a narrower outer portion 46b and 32b. As the screw 30 is tightened, it will cut threads into the narrower outer portions 46b and 32b of the finer end face 46 and the shelf 32 so as to further enhance the guiding of the screw outwardly from the box assembly 10 into a building structure 48.

In use, the box assembly 10 is first assembled by attaching the cover unit 16 to the base housing 14 using one or more fasteners 26. The assembled box assembly 10 is then positioned within an opening of a building structure 48, such as an understructure of a floor or a ceiling. During this positioning step, the mounting screw 30 may be pre-inserted by hand and held by the screw guide 44 formed between the cover 16 and the housing 14. This allows the installer to use both hands in positioning the box 10 within the structure 48. Once properly positioned, the installer may use a screwdriver from inside the box 10 to drive the screw 30 outwardly into the building structure. Again, since the screw 30 is held by the screw guide 44, the installer does not have to use one hand to hold both the screw and the box during installation.

Also, the screw guide 44 is formed without the need for complicated and expensive mold tooling. By providing one portion of the screw guide 44 on the cover unit 16 and the other portion of the screw guide on the housing 14, a standard mold die with one parting line is all that is required.

Thus, as a result of the present invention, a simple, easy to manufacture, assemble and install outlet box assembly is provided.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. An outlet box assembly for termination of electrical and communication wires comprising:
    a housing having a side wall terminating at an upper edge and defining an interior therein, said upper edge of said housing having a top surface; and
    a cover attached to said housing at said upper edge, said cover having a bottom surface,
    wherein a mounting screw guide is formed between said cover and said housing upon attachment of said cover to said housing to hold and guide a mounting screw during mounting of said box assembly to a structure, said bottom surface of said cover forming a first part of said mounting screw guide and said top surface of said housing forming a second part of said mounting screw guide; and said mounting screw guide communicating with said housing interior and extending between the interior and the exterior through said housing side wall.

2. An outlet box assembly as defined in claim 1, wherein said top surface of said housing includes an aperture adapted to receive a screw for fastening said cover to said housing.

3. An outlet box assembly as defined in claim 1, wherein said mounting screw guide is formed between respective mold parting lines of said housing and said cover.

4. An outlet box assembly as defined in claim 1, wherein said housing is adapted to accommodate electrical and communication fixtures mounted directly therein.

5. An outlet box assembly as defined in claim 1, wherein said housing includes a base opposite said cover adapted for mounting an outlet box thereto.

6. An outlet box assembly as defined in claim 5, further comprising an outlet box mounted to said base portion of said housing, said outlet box having electrical and communication fixtures mounted therein.

7. An outlet box assembly as defined in claim 1, wherein said cover comprises a frame and a lid hingedly attached to said frame.

8. An outlet box assembly as defined in claim 7, wherein said lid includes a latch adapted to releasably engage said frame.

9. An outlet box assembly comprising:
    a housing defining an interior therein; and
    a cover attached to said housing,
    wherein a mounting screw guide is formed between said cover and said housing upon attachment of said cover to said housing for holding and guiding a mounting screw during mounting of said box assembly to a structure, and
    wherein said cover includes a bottom surface and said housing includes a top surface, said mounting screw guide being formed between said bottom surface of said cover and said top surface of said housing upon attachment of said cover to said housing, and
    wherein said top surface of said housing includes a groove formed therein and said bottom surface of said cover includes a finger extending therefrom, said finger cooperating with said groove to form said mounting screw guide.

10. An outlet box assembly as defined in claim 9, wherein said finger has a width substantially equal to a width of said groove to provide a slip fit relationship therebetween.

11. An outlet box assembly as defined in claim 9, wherein said groove includes a bottom defined by a shelf and said finger includes an end face, said mounting screw guide being formed between said shelf and said end face.

12. An outlet box assembly as defined in claim 11, wherein said groove shelf extends inwardly into said housing interior to form a ledge for facilitating initial placement of the mounting screw in said mounting screw guide.

13. An outlet box assembly as defined in claim 11, wherein said shelf and said finger end face are formed at an angle with respect to said upper surface of said housing, said shelf being closest to said upper surface of said housing at said housing interior.

14. An outlet box assembly as defined in claim 11, wherein said shelf and said finger end face define and inner guide portion adjacent said housing interior and a threadable outer portion, said guide portion having a dimension substantially equal to the diameter of a mounting screw and said threadable portion being narrower than said guide portion, wherein said threadable portion is adapted to be threaded by the mounting screw upon tightening of the mounting screw.

15. An outlet box assembly for termination of electrical and communication lines comprising:
    a housing having a side wall terminating in an upper rim and defining a housing interior, said upper rim having a transverse groove formed therein communicating with said housing interior; and
    a cover attached to said housing, said cover having a bottom surface and a finger extending from said bottom surface, said finger being received in said housing groove to define a mounting screw guide for holding and guiding a mounting screw during mounting of said box assembly to a structure.

* * * * *

UNITED STATES PATENT AND TRADEMARK OFFICE
CERTIFICATE OF CORRECTION

PATENT NO.       : 7,105,742 B1                                        Page 1 of 1
APPLICATION NO.  : 11/147712
DATED            : September 12, 2006
INVENTOR(S)      : Robert K. Jolly It is certified that error appears in the above-identified patent and that said Letters Patent is hereby corrected as shown below:

<u>Column 5, line 41,</u>    now reads: "includes a base opposite"

should read: --includes a base portion opposite--

Signed and Sealed this

Sixth Day of March, 2007

JON W. DUDAS
*Director of the United States Patent and Trademark Office*